(12) United States Patent
Bernardi

(10) Patent No.: US 9,255,656 B2
(45) Date of Patent: Feb. 9, 2016

(54) FITTING FOR A HEAT PUMP AND METHOD OF INSTALLATION

(71) Applicant: United States ThermoAmp Inc., Latrobe, PA (US)

(72) Inventor: William P. Bernardi, Ligonier Township, PA (US)

(73) Assignee: United States ThermoAmp Inc., Latrobe, PA (US)

( * ) Notice: Subject to any disclaimer, the term of this patent is extended or adjusted under 35 U.S.C. 154(b) by 45 days.

(21) Appl. No.: 13/960,225

(22) Filed: Aug. 6, 2013

(65) Prior Publication Data

US 2014/0232104 A1   Aug. 21, 2014

Related U.S. Application Data

(60) Provisional application No. 61/680,427, filed on Aug. 7, 2012.

(51) Int. Cl.
*F16L 11/12*    (2006.01)
*F16L 25/02*    (2006.01)

(52) U.S. Cl.
CPC .......... *F16L 25/023* (2013.01); *Y10T 29/49227* (2015.01)

(58) Field of Classification Search
USPC ...................................... 285/48, 52
See application file for complete search history.

(56) References Cited

U.S. PATENT DOCUMENTS

| | | | | | |
|---|---|---|---|---|---|
| 2,867,463 | A | * | 1/1959 | Snider ........................... | 277/612 |
| 3,115,354 | A | * | 12/1963 | Bowan et al. ................... | 285/52 |
| 3,517,950 | A | * | 6/1970 | Anderson ........................ | 285/52 |
| 3,612,578 | A | * | 10/1971 | Bagnulo ......................... | 285/50 |
| 4,595,218 | A | * | 6/1986 | Carr et al. ..................... | 285/47 |
| 4,605,248 | A | * | 8/1986 | Goldsmith et al. ............. | 285/52 |
| 4,848,804 | A | * | 7/1989 | Weigl ............................. | 285/52 |
| 5,308,122 | A | * | 5/1994 | Crawford et al. ............... | 285/52 |
| 5,447,340 | A | * | 9/1995 | Sands et al. .................... | 285/52 |
| 6,286,875 | B1 | * | 9/2001 | Snodgrass et al. .............. | 285/52 |

* cited by examiner

*Primary Examiner* — Aaron Dunwoody
(74) *Attorney, Agent, or Firm* — The Webb Law Firm

(57) ABSTRACT

A fitting for a heat pump having at least one heat exchanger includes a first fitting element configured for connection with a tubing portion of the heat exchanger and a second fitting element removably connectable to the first fitting element and configured for connection with a tubing portion of the heat exchanger. A non-conductive element is disposed between at least a portion of the first fitting element and at least a portion of the second fitting element such that, when connected, the non-conducting element deforms between the first fitting element and the second fitting element to electrically isolate the second fitting element from the first fitting element.

11 Claims, 8 Drawing Sheets

SECTION A-A'

FITTING FOR A HEAT PUMP AND METHOD OF INSTALLATION

CROSS-REFERENCE TO RELATED APPLICATIONS

This disclosure claims the benefit of U.S. Provisional Application No. 61/680,427, filed Aug. 7, 2012, which is hereby incorporated by reference in its entirety.

BACKGROUND OF THE INVENTION

1. Field of the Invention

The present disclosure relates to an isolation fitting for a heat exchanger of a heat pump, and, more specifically, to an isolation fitting and a method for electrically isolating the heat exchanger of a heat pump.

2. Description of Related Art

Heat pumps are increasingly replacing fossil fuel heaters, especially in applications where heat pumps are a more cost effective heating method. Air-source heat pumps have been used in various applications to remove heat from the outdoor air and move it to another fluid or heat sink. Applications for such heat pumps include space and water heating, and providing process heat for industrial and commercial applications, including agricultural aquariums, fish ponds, and the like.

While initially overlooked for their higher initial cost, in the last few decades swimming pool heat pumps have become increasingly popular as a more efficient and cost effective alternative to fossil fuel pool heaters, such as natural gas, propane, and oil-fired units. Due to their significant operating cost savings compared to fossil fuel pool heaters, the higher initial cost of heat pumps can be quickly recouped. Such higher cost of heat pumps is largely due to the additional components they have compared to conventional fossil fuel heaters. Typical fossil fuel heaters include a gas control module, a firebox, and a heat exchanger coil. The pool water passes through the inside of the heat exchanger coil, while the hot combustion gases pass over the outside. The coil is usually made from copper. In the event that the coil corrodes or leaks, the entire heat exchanger coil is replaced. Corrosion of the heat exchanger coil usually does no damage to the rest of the heater. While replacement of the coil may be costly and inconvenient, it typically does require replacement of the entire heater.

With reference to FIG. 1, a typical heat pump HP includes an air-moving device 1, such as a fan, and a first heat exchanger 2 adapted for extracting heat from the air moved by the air-moving device 1. The heat pump HP further includes a refrigerant compressor 3 configured for compressing, and thereby heating, a refrigerant gas. The second heat exchanger 4 is adapted for delivering heat from the heated refrigerant to circulating pool water. The second heat exchanger 4 includes an inlet 5 for taking in unheated pool water and an outlet 6 for delivering heated pool water after it passes through the second heat exchanger 4. The inlet 5 and the outlet 6 are connected to a pump and filter circuit (not shown) that circulates pool water through the second heat exchanger 4. A metering device 7, such as an expansion valve, is provided between the first heat exchanger 2 and the second heat exchanger 4. The metering device 7 creates a high pressure on one end thereof for condensing the hot compressed refrigerant gas and a low pressure on the other end thereof to evaporate the cooled liquid refrigerant. The compressor 3 includes a motor that requires high voltage electric power to compress the refrigerant gas against the metering device 7 and circulate it through the first and second heat exchangers 2, 4. The refrigerant is circulated through refrigerant tubing 10, such as copper tubing, that runs between the first heat exchanger 2, the compressor 3, and a second heat exchanger 4.

For safety reasons and to meet various electrical codes, all parts of the heat pump HP which may potentially become energized through a short circuit or other fault must be grounded to a local earth ground. Grounding provides an electrical path for any short circuits and trips a power circuit breaker. The refrigerant lines are typically brazed or silver soldered to provide a seal and a closed circuit containing the refrigerant. Such construction also creates an electrically conductive loop of metal between the heat pump components. In this way, a short circuit to any one component of the heat pump HP will result in a tripped power circuit breaker.

In many wiring circuits, the ground wire can be a significant length away from the power supply box and the local earth ground can build a resistance and create a stray voltage drop should any small leakage of charge occur. Recent trends toward the use of electronic chlorine generators, which use a low voltage and salt to generate sanitizing sodium hypochlorite via electrolysis, create an additional source of stray voltage through the pool water to the second heat exchanger 4. In the case of a swimming pool heat pump, this stray voltage drop becomes critical since the copper tubing and thus the second heat exchanger 4 are in direct contact. This can lead to the formation of a galvanic cell. Since most pool water is treated with chlorine or bromine, or contains some type of salt ions, such pool water is generally conductive and can enhance galvanic corrosion.

Thus, the second heat exchanger 4 of the heat pump HP is subject to high pressure and high temperature due to the flow of pressurized refrigerant therethrough, corrosive chemicals from the pool water, and is subject to galvanic corrosion from any stray voltage. Although the use of ground fault circuit breakers and the adoption of corrosion resistant heat exchanger materials such as titanium have minimized safety and corrosion concerns, they have not eliminated them. Accordingly, it is desirable that the second heat exchanger 4 (or condenser heat exchanger) is electrically isolated from the rest of the heat pump HP to provide additional protection from shock hazard in addition to existing circuit breaker and optional ground fault circuit breaker protection should a short circuit occur between the power supply and the heat pump metal refrigeration circuit tubing. An additional concern with the second heat exchanger 4 is the prevention of galvanic corrosion by isolating the tubes of the second heat exchanger 4 from any stray voltage that can be present between the metal refrigeration circuit tubing and the ground wire from the breaker box. Additionally, if the tubing on the second heat exchanger 4 corrodes and permits swimming pool or spa water to enter the sealed refrigeration system, the entire heat pump HP must be replaced. Therefore, it is also highly desirable to provide a fitting that allows replacement of the second heat exchanger 4 without replacing the entire heat pump HP.

Within the prior art, the Heat Siphon® swimming pool heat pump, manufactured and distributed by United States ThermoAmp, Inc. of Latrobe, Pa., USA, includes a fitting (see FIGS. 1-3) which electrically isolates the heat exchanger from the pool water while maintaining a high pressure seal to contain the hot refrigerant gas and prevent it from leaking out of the closed heat pump piping circuit. Heat Siphon® is a registered trademark (U.S. Pat. No. 3,243,696) of United States ThermoAmp, Inc.

The fitting, shown in general by reference number 8 in FIG. 1 and in detail in FIGS. 2-3, is disposed on the refrigerant tubing 10 between (a) the second heat exchanger 4 and the compressor 3 and (b) between the second heat exchanger 4 and the metering device 7. The fitting 8 includes a first fitting 9 that is joined to a second fitting 12 by a nut 13. The first and second fittings 9, 12 are connected to the tubing 10 of the heat pump HP. The nut 13 is threaded onto external threads 14 of the first fitting 9. A flange 15 of the second fitting 12 is disposed within the nut 13 such that the second fitting 12 may be compressed within the nut 13. The second fitting 12 is typically made from titanium and is welded to the tubing extending to and from the second heat exchanger 4. The first fitting 9 and the nut 13 are generally made from brass and connect to the copper tubing 10 of the heat pump HP. A pair of elastomeric rings 11 is disposed above and below the flange 15 to prevent direct physical contact between the flange 15 and the first fitting 9 or the nut 13. The elastomeric rings are typically made from a Teflon® material or other similar material. "Teflon" is a registered trademark (U.S. Pat. No. 1,592,650) of E.I. Du Pont De Nemours and Co. Corporation, Wilmington, Del., USA. An o-ring 17 is disposed in a groove 16 at the terminal end of the first fitting 9. The o-ring 17 contacts the terminal end of the second fitting 12 as the nut 13 is tightened to provide a seal for the refrigerant flowing through the fitting 8.

While the fitting 8 described above has had a widespread use for a number of years, there are a number of disadvantages associated with this design. Because the second fitting 12 is welded to the tubing of the second heat exchanger 4, the nut 13 and the lower ring 11 disposed between the flange 15 and the nut 13 must be assembled onto the tubing 10 before the second fitting 12 is welded to the tubing 10. In the event that the second fitting 12 is welded without placing the lower ring 11 and the nut 13, the second fitting 12 must be cut off from the tubing such that the lower ring 11 and the nut 13 can be placed onto the tubing 10. This configuration also precludes replacement of the lower ring 11 if it is damaged, physically defective, or if it deteriorates. Additionally, the o-ring 17 must be assembled into the groove 16 with great care such that it does not fall out of position or become pinched as the nut 13 is tightened on the first fitting 9. When installing the o-ring 17 in the field, it is often difficult to maintain it within the groove 16 while assembling the fitting 8.

SUMMARY OF THE INVENTION

Generally, provided is a fitting for a heat pump and method of installation that address or overcome some or all of the drawbacks and deficiencies discussed above in connection with existing fitting designs.

In view of the shortcomings of the existing fitting designs, it is desirable to provide a fitting that electrically isolates the condenser heat exchanger from the remaining components of the heat pump to provide additional protection from shock hazard in addition to existing circuit breaker and optional ground fault circuit breaker protection should a short circuit occur between the power supply and the heat pump metal refrigeration circuit tubing. There is an additional need in the art to prevent galvanic corrosion of the condensing heat exchanger by isolating the tubes of the condensing heat exchanger from any stray voltage that can be present between the metal refrigeration circuit tubing and the ground wire from the breaker box. In order to address the shortcomings of the existing design, one preferred and non-limiting embodiment defines a fitting for a heat pump having at least one heat exchanger, wherein the fitting includes a first fitting element configured for connection with a tubing portion of the heat exchanger and a second fitting element removably connectable to the first fitting element and configured for connection with a tubing portion of the heat exchanger. A non-conductive element is disposed between at least a portion of the first fitting element and at least a portion of the second fitting element such that, when connected, the non-conducting element deforms between the first fitting element and the second fitting element to electrically isolate the second fitting element from the first fitting element.

In accordance with another preferred and non-limiting embodiment, the first fitting element includes a head portion, a threaded body portion, and a first orifice extending through the head portion and the threaded body portion. The fitting further includes a nut having a central opening, where the nut is configured for threadably connecting to the threaded body portion of the first fitting element. The second fitting element includes a radially extending flange received within the central opening of the nut such that the non-conductive element is disposed radially between the flange and the nut and axially between the flange and the first fitting element. The non-conductive element is configured to deform upon threadably connecting the nut and the threaded body portion of the first fitting element. The non-conductive element remains deformed after the nut is disconnected from the threaded body portion of the first fitting to retain a seal within a seal groove.

In yet another preferred and non-limiting embodiment, the non-conductive element includes a first lip configured to engage a first end of the flange and a second lip longitudinally offset from the first lip and configured to engage a second end of the flange, such that the non-conductive element is retained on the second fitting element. The non-conductive element further includes a radially-deflectable portion that is configured to deflect upon contact with a guiding surface of the nut. At least a portion of the non-conductive element is received in an annular space defined between an inner surface of the central opening of the nut and an outer surface of the second fitting element. The non-conductive element defines an electrical isolation clearance barrier that interrupts an electrical path between the first fitting element and the second fitting element.

In a further preferred and non-limiting embodiment, the non-conductive element further includes a tapered portion configured to facilitate placement of the non-conductive element around the flange of the second fitting element. At least one of the first fitting element and the second fitting element is formed from a non-corrosive material.

In accordance with another preferred and non-limiting embodiment, a fitting includes a first fitting element configured for connection with a first tubing portion and a second fitting element removably connectable to the first fitting element and configured for connection with a second tubing portion. A non-conductive element is disposed between at least a portion of the first fitting element and the second fitting element such that, when connected, the non-conducting element deforms between the first fitting element and the second fitting element to electrically isolate the second fitting element from the first fitting element. The first fitting element further includes a head portion, a threaded body portion, and a first orifice extending through the head portion and the threaded body portion. The fitting further includes a nut having a central opening, where the nut being configured for threadably connecting to the threaded body portion of the first fitting element. The second fitting element further includes a radially extending flange received within the central opening of the nut such that the non-conductive element is disposed radially between the flange and the nut and axially between the flange and the first fitting element. In a further preferred and non-limiting embodiment, the non-conducting element includes a radially-deflectable portion configured to deflect upon contact with a guiding surface of the nut. The non-conducting element further includes a first lip configured to engage a first end of the flange and a second lip longitudinally offset from the first lip and configured to engage a second end of the flange such that the non-conducting element is retained on the second fitting element.

In accordance with a further preferred and non-limiting embodiment, a method for electrically isolating a first portion of a fitting from a second portion of a fitting configured for use on a heat pump includes: positioning a nut over a tubing portion such that the tubing portion extends through the nut and securing a second fitting element to a terminal end of the tubing portion such that at least a portion of the second fitting element is received within the nut. securing a non-conducting element around the second fitting element. A first fitting element is connected with the nut such that the non-conducting element is deformed between the first fitting element and the nut. The non-conducting element provides an electrical isolation gap to electrically isolate the second fitting element from the first fitting element and the nut. A seal is positioned within a seal groove on the second fitting element prior to connecting the first fitting element with the nut. The first fitting element is secured to a terminal end of a second tubing portion.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

DETAILED DESCRIPTION OF THE INVENTION

Figure 1:
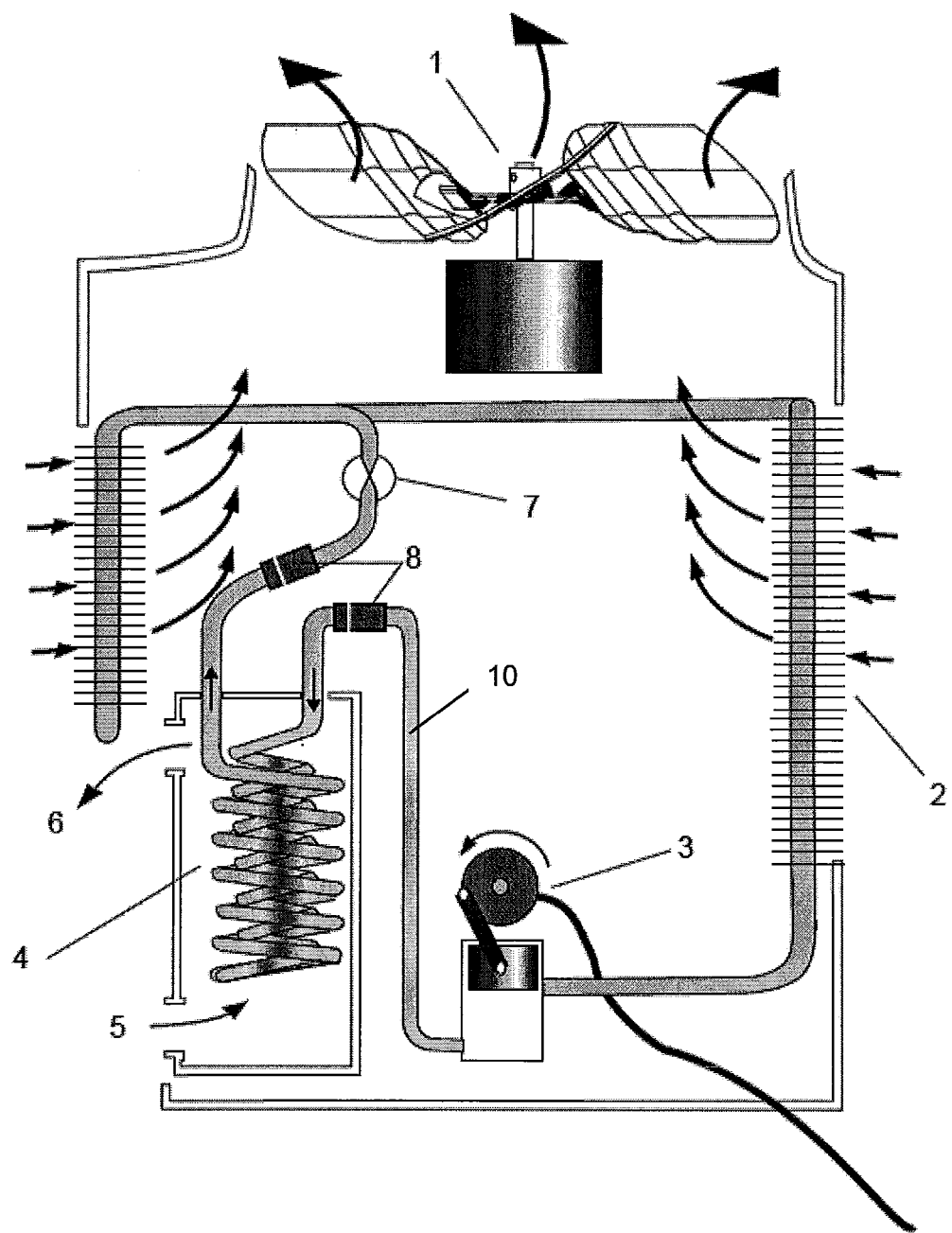
FIG. 1 is a schematic view of a heat pump having an isolation fitting in accordance with a prior art embodiment.
Figure 2:
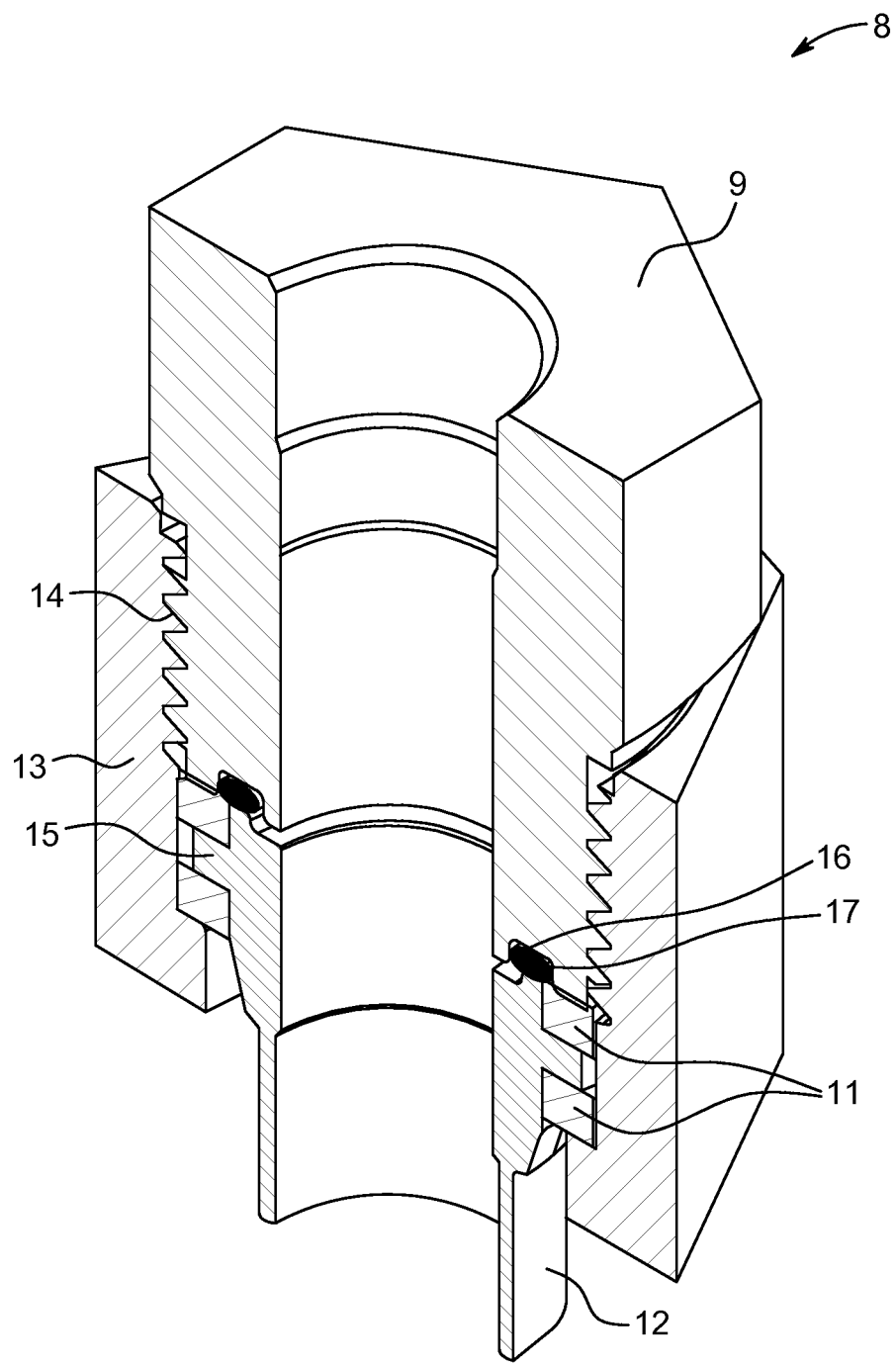
FIG. 2 is a cross-sectional perspective view of the isolation fitting shown in FIG. 1.
Figure 3:
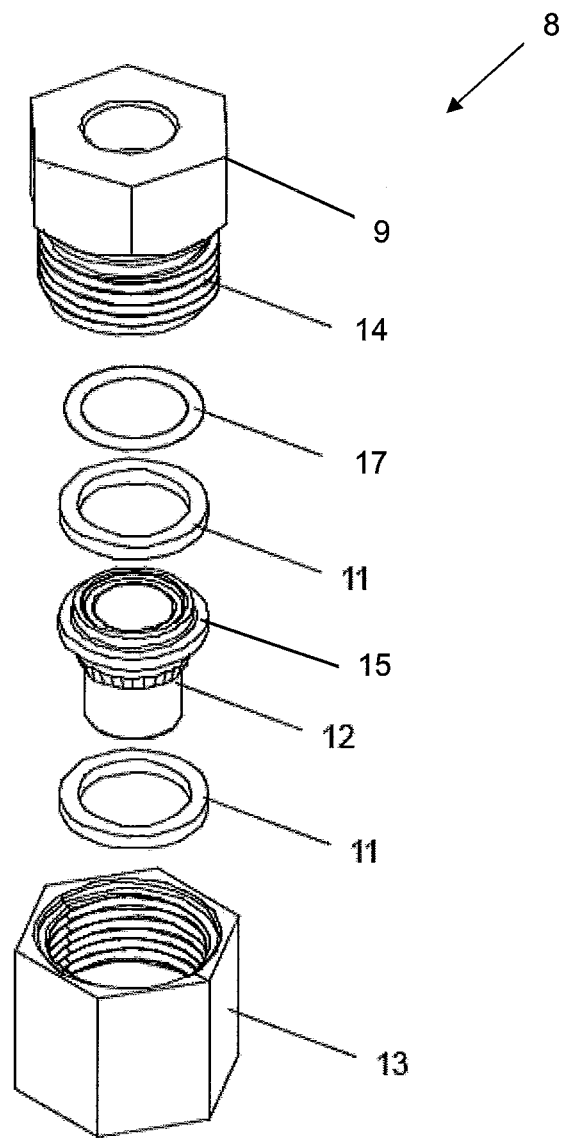
FIG. 3 is an exploded view of the isolation fitting shown in FIG. 1.

The following description is provided to enable those skilled in the art to make and use the described embodiments contemplated for carrying out the various embodiments described herein. Various modifications, equivalents, variations, and alternatives, however, will remain readily apparent to those skilled in the art. Any and all such modifications, variations, equivalents, and alternatives are intended to fall within the spirit and scope of the present invention. Further, for purposes of the description hereinafter, the terms "end", "upper", "lower", "right", "left", "vertical", "horizontal", "top", "bottom", "lateral", "longitudinal" and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting. For the purpose of facilitating understanding of the invention, the accompanying drawings and description illustrate preferred embodiments thereof, from which the invention, various embodiments of its structures, construction and method of operation, and many advantages may be understood and appreciated.

As discussed hereinafter, the present invention is directed to a fitting for a heat pump used for heating a liquid, such as water in a swimming pool, using at least one heat exchanger. It should be noted that this term—"fitting"—encompasses any type of a connection element adapted for connecting to the tubing of a heat pump at the inlet and outlet ends of a coil of a condensing heat exchanger. Various embodiments of the fitting (alone and/or in combination with other blocks) are shown and illustrated in FIGS. 4-8B.

Figure 4:
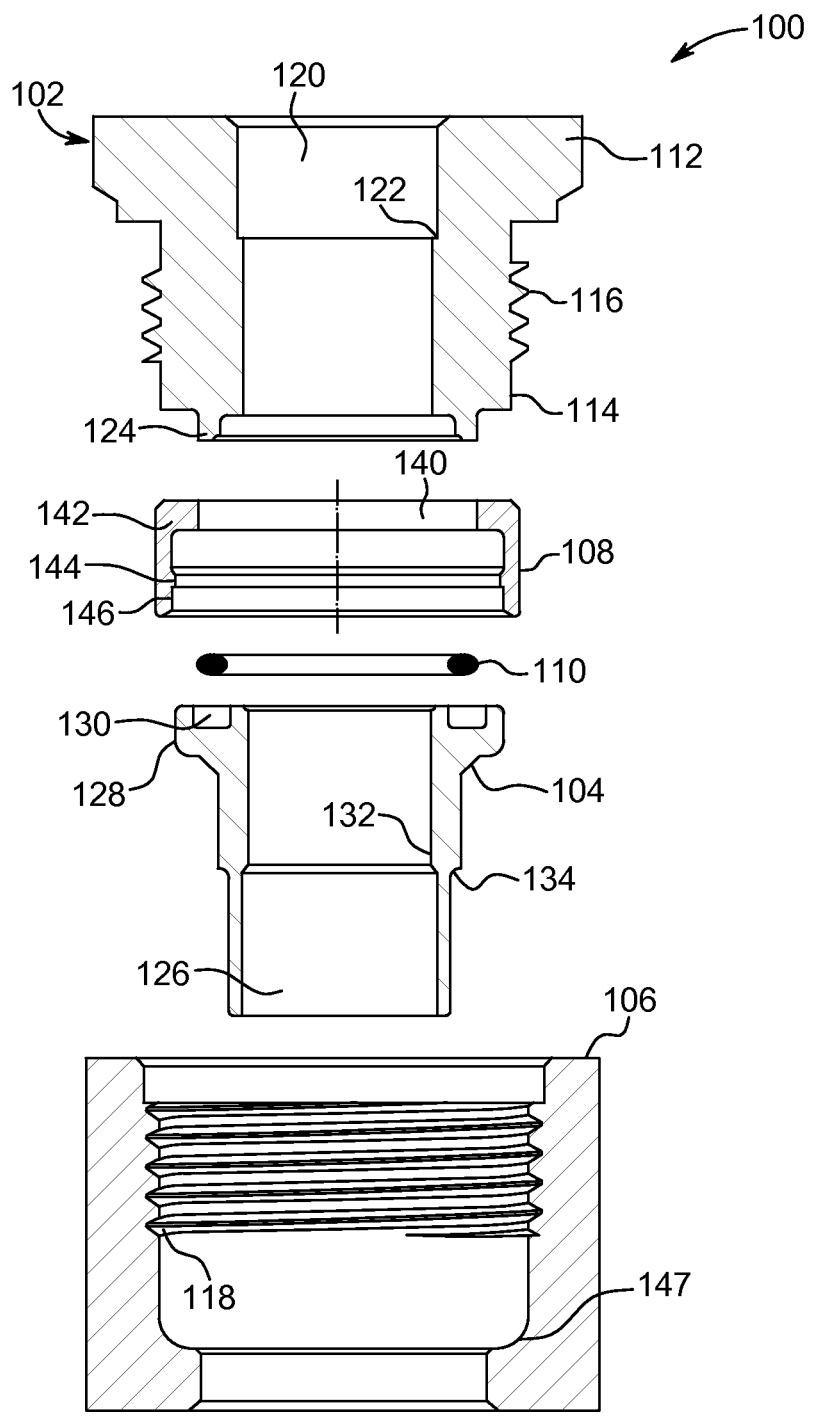
FIG. 4 is an exploded view of an isolation fitting in accordance with an embodiment of the present invention.

With reference to FIG. 4, an exploded view of an isolation fitting 100 (hereinafter referred to as "fitting 100") is shown in accordance with one preferred and non-limiting embodiment. The fitting 100 generally includes a first fitting element 102 and a second fitting element 104 connected by a nut 106 (see FIGS. 5-7). The first fitting element 102 desirably connects to tubing of the heat pump (shown in FIG. 7) located upstream or downstream from the condensing heat exchanger while the second fitting element 104 connects to the tubing of the condensing heat exchanger. A non-conducting element, which is in one preferred and non-limiting embodiment formed as a deformable ring 108, and a seal 110 are provided at an interface between the first fitting element 102 and the second fitting element 104 as will be described in greater detail hereafter.

With continuing reference to FIG. 4, the first fitting element 102 has a generally annular shape with a head 112 provided at a first end and a body 114 extending from the head 112 toward the second end along a longitudinal length of the first fitting element 102. The head 112 is shaped such that a tightening member, such a wrench (not shown), may be used to engage the head 112 while connecting the first fitting element 102 to the nut 106. The body 114 of the first fitting element 102 includes a male thread 116 that is configured to threadably engage a corresponding female thread 118 on the nut 106. In another preferred and non-limiting embodiment, the male thread 116 may be provided on the nut 106, while the corresponding female thread 118 may be provided on the body 114 of the first fitting element 102. A first orifice 120 extends through the head 112 and the body 114 of the first fitting element 102 along a longitudinal centerline thereof. The first orifice 120 includes a recess 122 extending partially along the longitudinal length of the first fitting element 102.

The recess 122 is larger than the first orifice 120 and is adapted to receive tubing, as will be described hereinafter. In one preferred and non-limiting embodiment, the recess 122 may be threaded to mate with a correspondingly threaded tubing. Of course, a compression fit or suitable connection between the fitting 100 and the tubing are not precluded. The terminal end of the body 114 defines a projection 124 that extends around at least a portion of the circumference of the body 114. The projection 124 acts on the seal 110 when the first fitting element 102 is tightened relative to the nut 106, as will be described in greater detail hereinafter.

Figure 7:
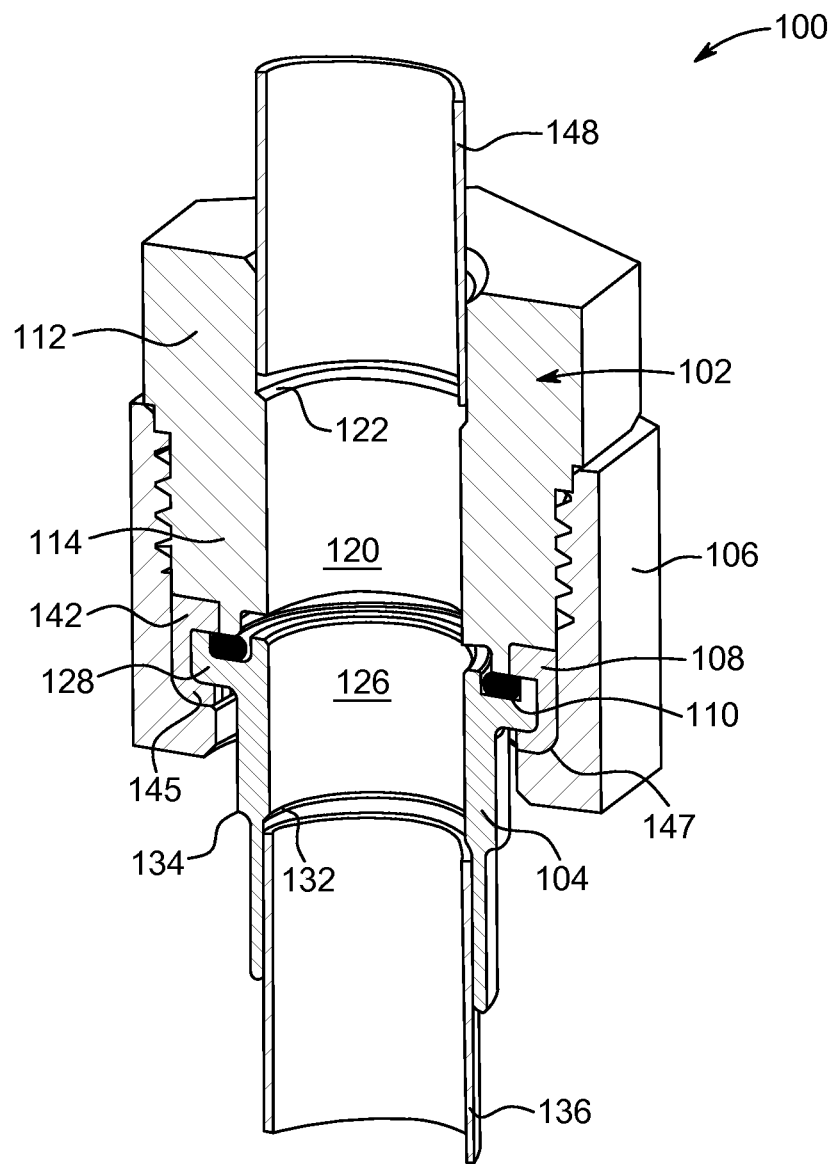
FIG. 7 is a cross-sectional perspective view of the isolation fitting of FIG. 6 further illustrating sections of heat pump tubing.

With continuing reference to FIG. 4, the second fitting element 104 is generally cylindrical with a second orifice 126 extending along the entire longitudinal length of the second fitting element 104. A flange 128 extends radially outward from one end of the second fitting element 104. The flange 128 is adapted for insertion into the nut 106 without physically contacting the nut 106, as will be described hereinafter. A seal groove 130 extends at least partially into the flange 128 in a substantially axial direction defined by a longitudinal centerline of the second fitting element 104. The seal groove 130 is configured for receiving the seal 110 such that the seal 110 is retained within the seal groove 130 and cannot fall out of the seal groove 130 as the second fitting element 104 is handled during an installation procedure. In one preferred and non-limiting embodiment, the seal groove 130 is dimensioned such that the seal 110, when positioned within the seal groove 130, extends at least partially out of the seal groove 130. The seal 110 is compressed within the seal groove 130 as the first fitting element 102 is tightened relative to the nut 106. The second fitting element 104 further includes an inner step 132 extending radially inward relative to the longitudinal axis of the second flitting element 104 and an outer step 134 that extends radially outward relative to the longitudinal axis. The inner step 132 is configured as a stop surface for a second tubing portion 136 (shown in FIG. 7) extending from the condensing heat exchanger. As shown in FIG. 7, the second tubing portion 136 is inserted into the second orifice 126 of the second fitting element 104 until a terminal end of the second tubing portion 136 contacts the inner step 132. Similarly, if the second tubing portion 136 is larger than the outer diameter of the second orifice 126, the second tubing portion 136 is inserted over the second orifice 126 until a terminal end of the second tubing portion 136 contacts the outer step 134.

Figure 5:
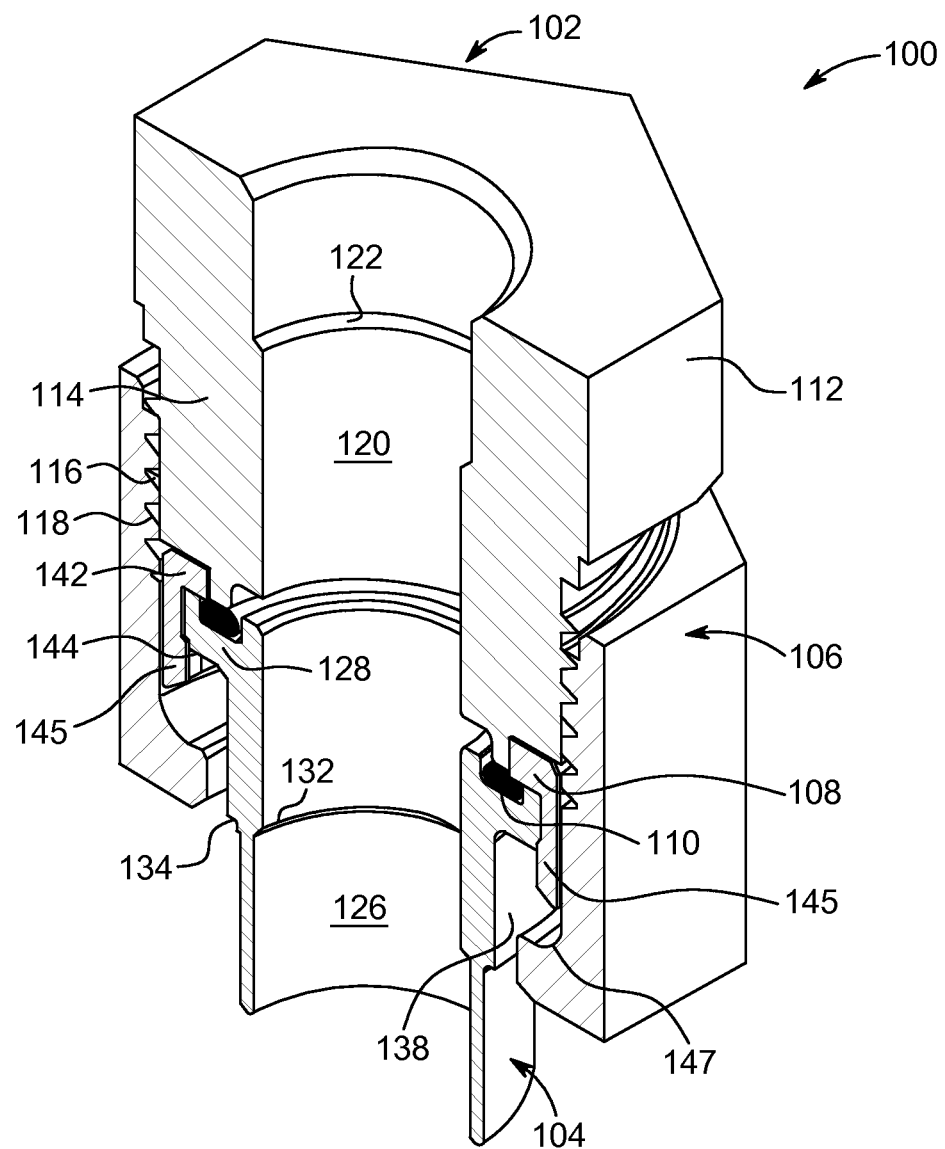
FIG. 5 is a cross-sectional perspective view of the isolation fitting shown in FIG. 4, depicting a deformable ring in a first position.
Figure 6:
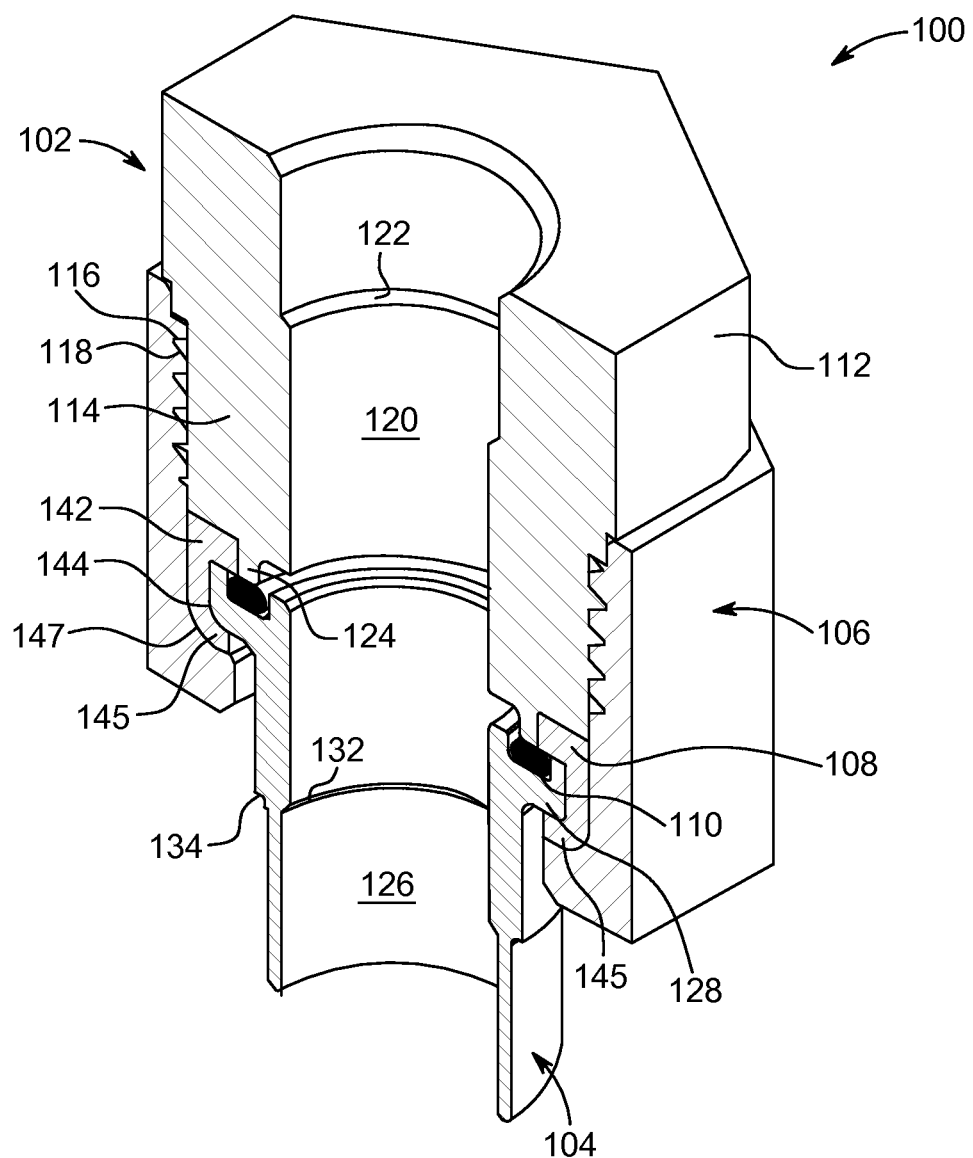
FIG. 6 shows a cross-sectional perspective view of the isolation fitting shown in FIG. 5 depicting the deformable ring in a second position.

With reference to FIGS. 5-6, and with continuing reference to FIG. 4, the deformable ring 108 is configured for fitting within an annular space 138 between the second fitting element 104 and the nut 106. The deformable ring 108 is made from an insulating material that does not conduct electricity. In one embodiment, the deformable ring 108 is made from Teflon. One of ordinary skill in the art will appreciate that the deformable ring 108 may be formed from any material that does not conduct electricity or is a poor conductor of electricity. In one preferred and non-limiting embodiment, the deformable ring 108 is formed from any plastic or electrically non-conducting material which can withstand high temperatures of at least 500° F. without deteriorating its mechanical or physical properties and which has sufficient compression set resistance to maintain its shape after assembly. In use, the deformable ring 108 fills the gap in the annular space 138 such that an electrical path is interrupted between the first fitting element 102 and the second fitting element 104. The deformable ring 108 is configured to deform within the annular space 138 from a first position (FIG. 5) to a second position (FIG. 6) as the first fitting element 102 is tightened relative to the nut 106.

Figure 8A:
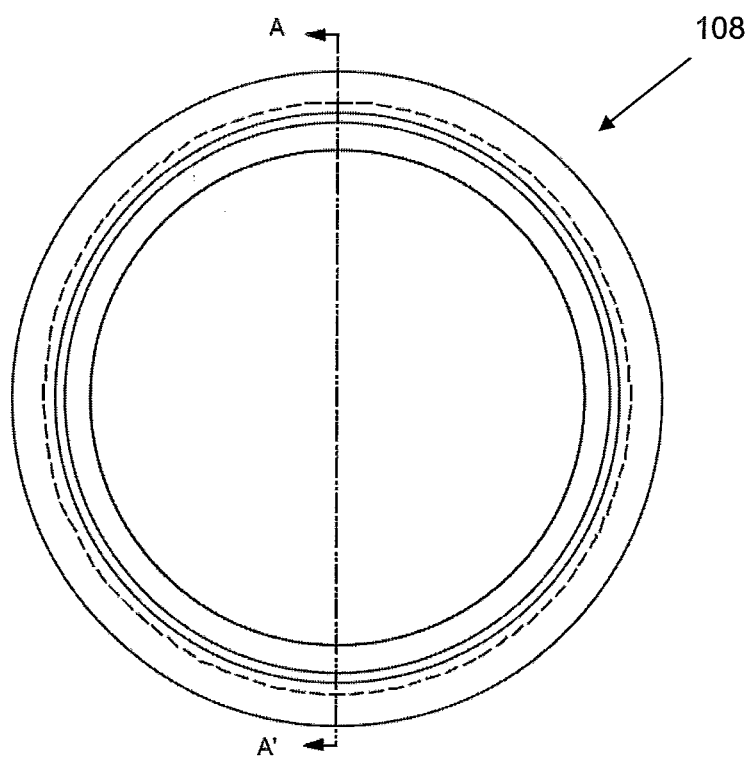
FIG. 8A is a top view of the deformable ring.
Figure 8B:
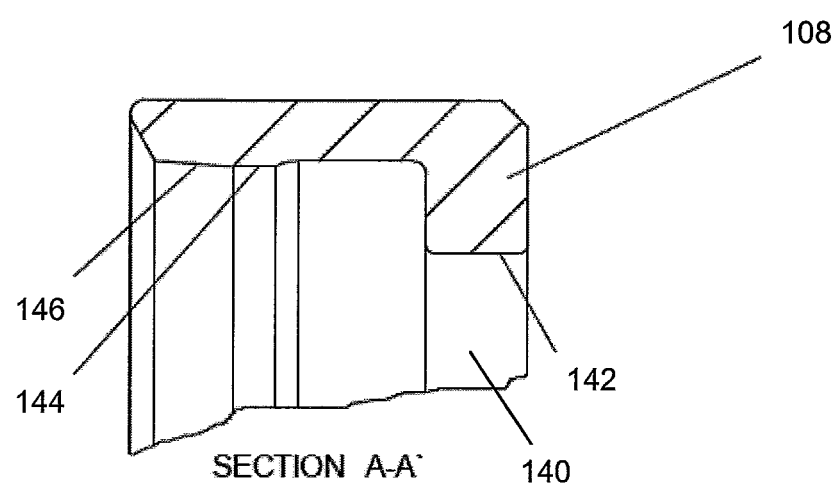
FIG. 8B is a cross-sectional view of the deformable ring shown in FIG. 8A taken along line A-A.

With reference to FIGS. 8A-8B, the deformable ring 108 has an annular shape having a central opening 140 with a first lip 142 extending radially inward at one end of the deformable ring 108. A second lip 144 also extends radially inward and is offset longitudinally relative to the first lip 142. The longitudinal separation between the first lip 142 and the second lip 144 is configured such that the flange 128 of the second fitting element 104 may be received therebetween. The gap between the outer diameter of the second fitting element 104 and the inner diameter of the deformable ring 108 may be minimized to ensure a tight connection. Desirably, the deformable ring 108 is adapted for connecting to the second fitting element 104 by hand and without using any tools.

With continuing reference to FIGS. 8A-8B, the first lip 142 extends over the flange 128 up to the seal groove 130, while the second lip 144 extends under the flange 128. In one preferred and non-limiting embodiment, the inner diameter of the second lip 144 is slightly smaller than the outer diameter of the flange 128 such that the second lip 144 is deflected outward as the deformable ring 108 is snapped onto the second fitting element 104. Desirably, the deflection of the second lip 144 is maintained such that the material strength of the deformable ring 108 is not exceeded. In this way, the deformable ring 108 can be secured to the second fitting element 104 by snapping the flange 128 between the first lip 142 and the second lip 144. This prevents the deformable ring 108 from being misplaced or removed from the second fitting element 104 during assembly of the fitting 100. The flange 128 of the second fitting element 104 may have a radiused upper edge that interfaces with a correspondingly shaped inner edge of the deformable ring 108 to ensure a tighter fit therebetween.

The deformable ring 108 further includes a radially-deflectable portion 145 that is configured for deforming radially inward as the deformable ring 108 is compressed between the second fitting element 104 and the nut 106. To facilitate placing of the deformable ring 108 onto the second fitting element 104, the radially-deflectable portion 145 has a tapered inner surface 146 that increases the inner diameter of the radially-deflectable portion 145 to be slightly larger than the outer diameter of the flange 128. Simultaneously, the tapered inner surface 146 minimizes or prevents contact with the female threads 118 on the nut 106 which may damage the deformable ring 108.

Referring back to FIGS. 5-6, as the first fitting element 102 is tightened relative to the nut 106, the terminal end of the radially-deflectable portion 145 of the deformable ring 108 is urged against the guiding surface 147 on the nut 106 (FIG. 5). The guiding surface 147 is radiused and urges the radially-deflectable portion 145 to deform radially inward (FIG. 6) as the nut 106 is further tightened. As the radially-deflectable portion 145 deforms, it wraps around the flange 128 of the second fitting element 104 to act as an electrical isolation clearance for any electrical charges. In another preferred and non-limiting embodiment, the position of the first fitting element 102 and the nut 106 may be reversed so the nut 106 becomes the fitting element 102 and the fitting element 102 becomes a nut 106 having the radiused guiding surface 147. The female threads 118 on the nut 106 are desirably formed to extend only partly along the longitudinal length of the nut 106 such that over-tightening of the deformable ring 108 is prevented when the first fitting element 102 is fully tightened relative to the nut 106. This assures that the deformable ring 108 is properly tightened each time the fitting 100 is assembled. As the first fitting element 102 is tightened relative to the nut 106, the projection on the terminal end of the body 114 engages the seal 110 such that the seal 110 is compressed within the seal groove 130 to prevent the escape of refrigerant through the fitting 100. As the first fitting element 102 is tightened relative to the nut 106, the deformable ring 108 deflects around the flange 128 of the second fitting element 104 and remains secured to the second fitting element 104 even after the first fitting element 102 is removed from the nut 106. In this way, the seal 110 is retained within the seal groove 130 even after the first fitting element 102 is removed. During maintenance and servicing of the seal 110, the deformable ring 108 can be deflected slightly such that the seal 110 can be removed from the seal groove 130.

With reference to FIG. 7, the first fitting element 102 is made from brass or copper such that it can be coupled with the first tubing portion 148 of the heat pump. The first fitting element 102 is desirably coupled to the first tubing portion 148 by brazing, soldering, or welding. The second fitting element 104 is desirably made from titanium or other non-corrosive material such that it can be coupled to the second tubing portion 136 of the condensing heat exchanger. The second fitting element 104 is desirably coupled to the second tubing portion 136 by brazing, soldering, or welding. One of ordinary skill in the art will understand that the first and second fitting elements 102, 104 may be adapted for connecting to the first and second tubing portions 136, 148 in any known manner.

Having described the structure of the fitting 100, a method of assembling the fitting onto the tubing of a heat pump will now be described. Initially, the nut 106 is positioned over the second tubing portion 136 such that such that the second tubing portion 136 extends through the central opening of the nut 106. The second fitting element 104 is then secured to the terminal end of the second tubing portion 136 such that the flange 128 is received within the central opening of the nut 106. The deformable ring 108 is then secured around the flange 128 such that the deformable ring 108 is disposed within the annular space 138 between the flange 128 and the nut 106. The seal 110 is then positioned within the seal groove 130 on the flange 128 prior to threadably connecting the first fitting element 102 with the nut 106. The first fitting element 102 is threadably connected with the nut 106 such that the deformable ring 108 is compressed between the first fitting element 102 and the nut 106. As discussed above, the deformable ring 108 provides an electrical isolation gap to electrically isolate the second fitting element 104 from the first fitting element 102 and the nut 106. The first fitting element 102 is then secured to a terminal end of the first tubing portion 148.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof. Further, although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A fitting for a heat pump having at least one heat exchanger, the fitting comprising:
    a first fitting element configured for connection with a tubing portion of the heat exchanger, the first fitting element having a head portion, a threaded body portion, and a first orifice extending through the head portion and the threaded body portion;
    a second fitting element removably connectable to the first fitting element and configured for connection with a tubing portion of the heat exchanger;
    a nut having a central opening, the nut being configured for threadably connecting to the threaded body portion of the first fitting element; and
    a non-conductive element disposed between at least a portion of the first fitting element and at least a portion of the second fitting element such that, when connected, the non-conducting element deforms between the first fitting element and the second fitting element to electrically isolate the second fitting element from the first fitting element,
    wherein the second fitting element has a radially extending flange received within the central opening of the nut, such that the non-conductive element is disposed radially between the flange and the nut and axially between the flange and the first fitting element, and
    wherein the non-conductive element has a radially-deflectable portion that deflects radially inward relative to a body portion of the non-conductive element upon direct contact with a radiused guiding surface of the nut as the nut is tightened, the non-conductive element defining an electrical isolation clearance barrier that interrupts an electrical path between the first fitting element and the second fitting element.

2. The fitting of claim 1, wherein the non-conductive element is configured to deform upon threadably connecting the nut and the threaded body portion of the first fitting element and wherein the non-conductive element remains deformed after the nut is disconnected from the threaded body portion of the first fitting to retain a seal within a seal groove.

3. The fitting of claim 1, wherein the non-conductive element further comprises a first lip configured to engage a first end of the flange and a second lip longitudinally offset from the first lip and configured to engage a second end of the flange, such that the non-conductive element is retained on the second fitting element.

4. The fitting of claim 1, wherein at least a portion of the non-conductive element is received in an annular space defined between an inner surface of the central opening of the nut and an outer surface of the second fitting element.

5. The fitting of claim 1, wherein the non-conductive element further comprises a tapered portion configured to facilitate placement of the non-conductive element around the flange of the second fitting element.

6. The fitting of claim 1, wherein at least one of the first fitting element and the second fitting element is formed from a non-corrosive material.

7. A fitting comprising,
    a first fitting element configured for connection with a first tubing portion, the first fitting element having a head portion, a threaded body portion, and a first orifice extending through the head portion and the threaded body portion;
    a second fitting element removably connectable to the first fitting element and configured for connection with a second tubing portion;

a nut having a central opening, the nut being configured for threadably connecting to the threaded body portion of the first fitting element; and a non-conductive element disposed between at least a portion of the first fitting element and at least a portion of the second fitting element such that, when connected, the non-conducting element deforms between the first fitting element and the second fitting element to electrically isolate the second fitting element from the first fitting element, wherein the second fitting element has a radially extending flange received within the central opening of the nut, such that the non-conductive element is disposed radially between the flange and the nut and axially between the flange and the first fitting element, and wherein the non-conducting element has a radially-deflectable portion deflects radially inward relative to a body portion of the non-conductive element upon direct contact with a radiused guiding surface of the nut as the nut is tightened, the non-conductive element defusing an electrical isolation clearance barrier that interrupts an electrical path between the first fitting element and the second fitting element.

8. The fitting of claim 7, wherein the non-conducting element further comprises a first lip configured to engage a first end of the flange and a second lip longitudinally offset from the first lip and configured to engage a second end of the flange, such that the non-conducting element is retained on the second fitting element.

9. A method for electrically isolating a first portion of a fitting from a second portion of a fitting configured for use on a heat pump, the method comprising:

positioning a nut over a tubing portion, such that the tubing portion extends through the nut;

securing a second fitting element to a terminal end of the tubing portion, such that at least a portion of the second fitting element is received within the nut;

securing a non-conducting element around the second fitting element;

connecting a first fitting element with the nut, such that a radially-deflectable portion of the non-conducting element is deflected radially inward relative to a body portion of the non-conductive element between the first fitting element and the nut upon direct contact with a radiused guiding surface of the nut as the nut is tightened, wherein the non-conducting element provides an electrical isolation gap to electrically isolate the second fitting element from the first fitting element and the nut.

10. The method of claim 9, further comprising positioning a seal within a seal groove on the second fitting element prior to connecting the first fitting element with the nut.

11. The method of claim 9, further comprising securing the first fitting element to a terminal end of a second tubing portion.

* * * * *

UNITED STATES PATENT AND TRADEMARK OFFICE
CERTIFICATE OF CORRECTION

PATENT NO. : 9,255,656 B2  
APPLICATION NO. : 13/960225  
DATED : February 9, 2016  
INVENTOR(S) : William P. Bernardi Page 1 of 1

It is certified that error appears in the above-identified patent and that said Letters Patent is hereby corrected as shown below:

Claims  
Column 11, Line 19, Claim 7, delete "defusing" and insert -- defining --

Signed and Sealed this  
Twenty-fourth Day of May, 2016

Michelle K. Lee  
*Director of the United States Patent and Trademark Office*